(12) United States Patent
Murakami et al.

(10) Patent No.: US 12,316,260 B2
(45) Date of Patent: May 27, 2025

(54) POWER CONVERSION DEVICE

(71) Applicant: Mitsubishi Electric Corporation, Tokyo (JP)

(72) Inventors: Satoshi Murakami, Tokyo (JP); Takahiro Okanoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 175 days.

(21) Appl. No.: 18/271,671

(22) PCT Filed: Feb. 2, 2021

(86) PCT No.: PCT/JP2021/003755
§ 371 (c)(1),
(2) Date: Jul. 11, 2023

(87) PCT Pub. No.: WO2022/168168
PCT Pub. Date: Aug. 11, 2022

(65) Prior Publication Data
US 2024/0072710 A1 Feb. 29, 2024

(51) Int. Cl.
*H02P 27/08* (2006.01)

(52) U.S. Cl.
CPC .................. *H02P 27/08* (2013.01)

(58) Field of Classification Search
CPC .......... H02P 21/22; H02P 21/14; H02P 27/06; H02P 25/22; H02P 21/18; H02P 27/08;
(Continued)

(56) References Cited

U.S. PATENT DOCUMENTS

2018/0067148 A1 3/2018 Tsuchida et al.
2018/0091081 A1* 3/2018 Suzuki ..................... H02P 6/28

FOREIGN PATENT DOCUMENTS

JP 2003-324985 A 11/2003
JP 2017-092789 A 5/2017
(Continued)

OTHER PUBLICATIONS

Extended European Search Report issued Feb. 28, 2024 in European Patent Application No. 21924565.1, 10 pages.
(Continued)

*Primary Examiner* — Antony M Paul
(74) *Attorney, Agent, or Firm* — XSENSUS LLP

(57) ABSTRACT

A power conversion device according to the present disclosure has one end connected to a DC voltage source and another end connected to a load, and includes: an inverter circuit which converts DC voltage from the DC voltage source to AC voltage to be outputted to the load, and includes a leg in which an upper arm and a lower arm each having a switching element, and a resistor, are connected in series, and a smoothing capacitor connected in parallel to the leg; a current detection circuit which detects voltage across the resistor, to detect current of the resistor; and a control circuit which controls the inverter circuit. The control circuit corrects the current value detected by the current detection circuit, using an operation condition of the inverter circuit, and controls the inverter circuit using the corrected current value. Thus, error occurring in the current detection circuit can be corrected.

7 Claims, 4 Drawing Sheets

(58) Field of Classification Search
CPC ... B62D 5/046; B62D 5/0463; H02M 1/0009; H02M 7/5395; H02M 7/53871; H02M 7/53875; H02K 11/27; H02K 11/33
See application file for complete search history.

(56) References Cited

FOREIGN PATENT DOCUMENTS

| | | |
|---|---|---|
| JP | 2018-040632 A | 3/2018 |
| WO | 2019/198496 A1 | 10/2019 |

OTHER PUBLICATIONS

Myoungho Kim, et al., "Compensation of Current Measurement Error for Current-Controlled PMSM Drives", IEEE Transactions on Industry Applications, vol. 50, No. 5, Sep./Oct. 2014, XP011559110, 9 pages.
International Search Report and Written Opinion mailed on Apr. 27, 2021, received for PCT Application PCT/JP2021/003755, filed on Feb. 2, 2021, 9 pages including English Translation.

* cited by examiner

FIG. 1
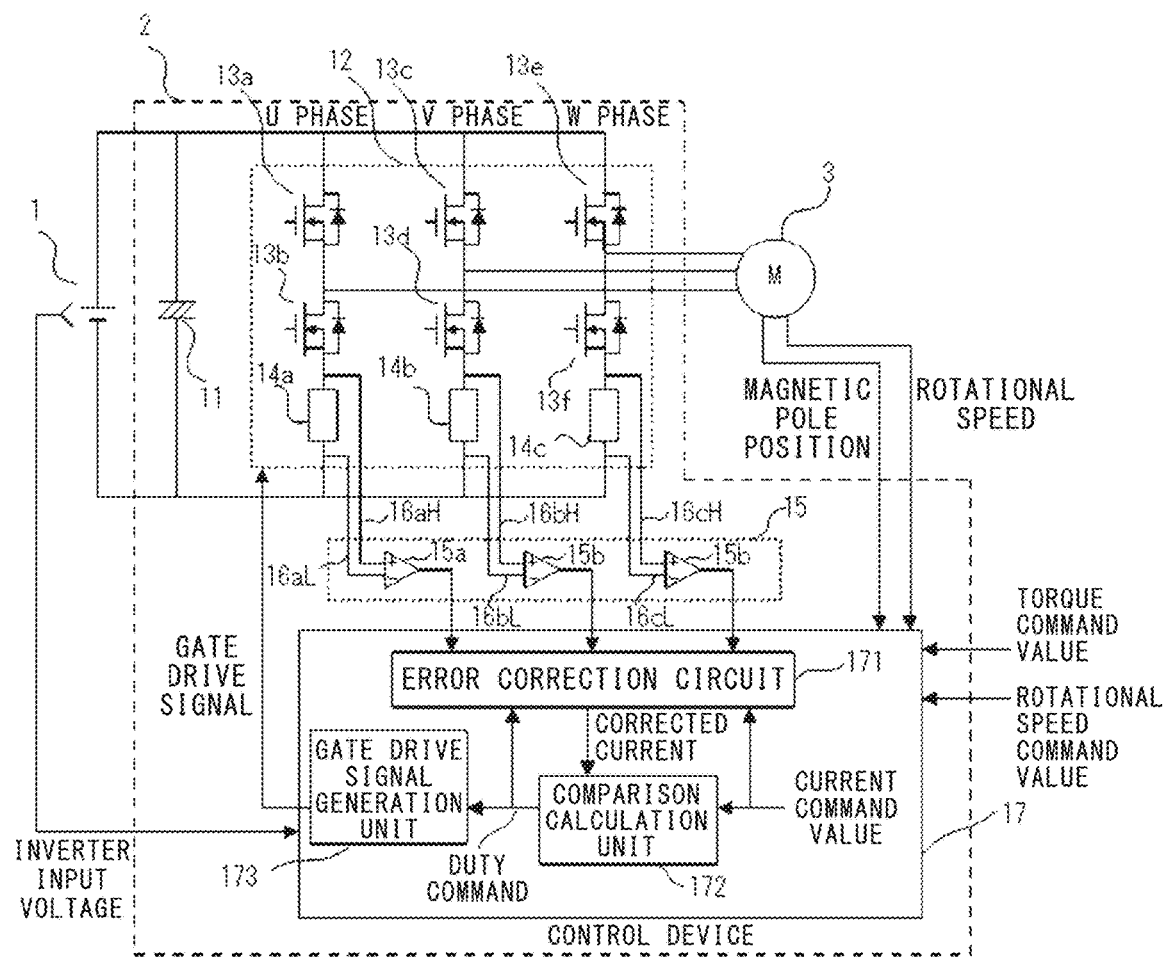
FIG. 2A    FIG. 2B    FIG. 2C
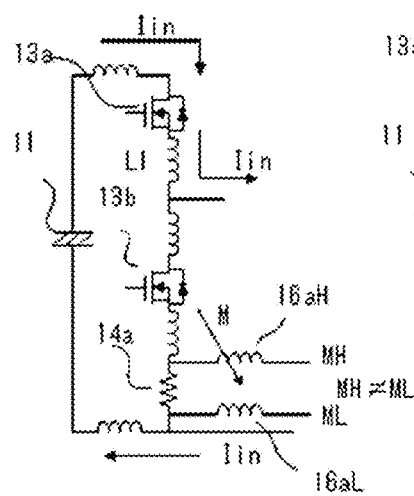 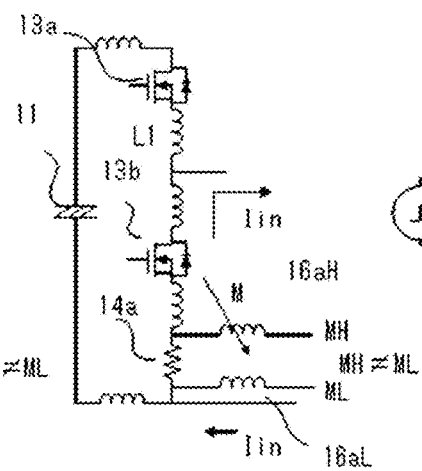 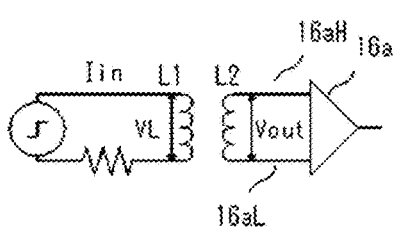

POWER CONVERSION DEVICE

CROSS-REFERENCE TO RELATED APPLICATION

The present application is based on PCT filing PCT/JP2021/003755, filed Feb. 2, 2021, the entire contents of which are incorporated herein by reference.

TECHNICAL FIELD

The present disclosure relates to a power conversion device for supplying power to a connected load.

BACKGROUND ART

A power conversion device is used for supplying power to a load such as a motor and controlling operation thereof. For example, in a case where a motor is connected as a load, in order to accurately control the motor, it is necessary to accurately acquire the position (angle) of a rotor and control currents for respective phases of the motor by an inverter for converting DC voltage to AC voltage. The inverter is a controller which changes voltages applied to the respective phases of the motor, to adjust motor currents. For the voltage adjustment, pulse width modulation (PWM: a method of changing voltage by adjusting the lengths of ON/OFF times of pulses) is often used, and the effective values of voltages applied to the motor are controlled using the ratio of the ON/OFF times. In this control, current flowing through the motor is detected and fed back to PWM operation of the inverter. Therefore, if the detected current value used for the control is different from the actually flowing current value, the motor cannot be appropriately controlled, and this can influence the noise vibration (NV) characteristics of the motor.

In order to accurately detect current of an inverter, disclosed is a current detection circuit configured such that a circuit for generating negative-phase-sequence voltage of induced voltage generated due to electromagnetic induction on a transmission line of a detection circuit is provided and the negative-phase-sequence voltage is added to voltage generated by the detection circuit, to cancel out the voltage (see, for example, Patent Document 1).

CITATION LIST

Patent Document

Patent Document 1: Japanese Laid-Open Patent Publication No. 2018-40632

SUMMARY OF THE INVENTION

Problems to be Solved by the Invention

In a power conversion device as shown in Patent Document 1, for canceling out error voltage on the current detection circuit due to electromagnetic induction, a circuit for generating error voltage having an inverted polarity and a circuit for adding the voltage are needed, thus causing a problem that the circuit size is increased.

The present disclosure has been made to solve the above problem, and an object of the present disclosure is to provide a power conversion device in which, even if error voltage occurs on a current detection circuit due to electromagnetic induction, the error voltage is calculated from the operation state of an inverter and correction is performed, whereby current of the inverter can be accurately detected, thus suppressing size increase of the inverter and improving accuracy of motor control.

Solution to the Problems

A power conversion device according to the present disclosure has one end connected to a DC voltage source and another end connected to a load, and includes: an inverter circuit which converts DC voltage from the DC voltage source to AC voltage and outputs the AC voltage to the load, the inverter circuit including a leg in which an upper arm and a lower arm each having a switching element, and a resistor, are connected in series, and a smoothing capacitor connected in parallel to the leg; a current detection circuit which detects voltage across the resistor, to detect current flowing through the resistor; and a control circuit which controls the inverter circuit. The control circuit corrects the current value detected by the current detection circuit, on the basis of an operation state of the inverter circuit, and controls the inverter circuit on the basis of the corrected current value.

Effect of the Invention

The power conversion device according to the present disclosure males it possible to correct error occurring on a current detection circuit without increasing the size of a circuit.

BRIEF DESCRIPTION OF THE DRAWINGS

FIG. 1 is a configuration diagram of a power conversion device according to embodiment 1.

FIG. 2A-2C illustrates induced voltage on a current detection circuit according to embodiment 1.

DESCRIPTION OF EMBODIMENTS

Embodiment 1

Figure 3A:
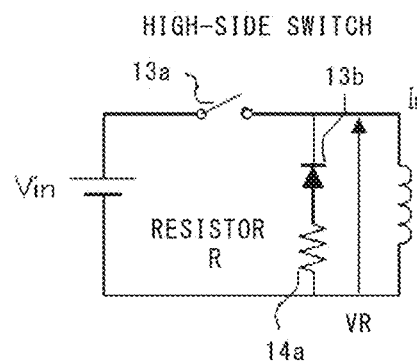
FIG. 3A and 3B illustrates a counter electromotive force generated on an inverter according to embodiment 1.

A power conversion device and a motor system using the power conversion device, according to embodiment 1 of the present disclosure, will be described with reference to the drawings. FIG. 1 is a configuration diagram showing the power conversion device and the motor system according to embodiment 1. In FIG. 1, the motor system includes a DC voltage source 1, a power conversion device 2, and a motor 3 as a load. The DC voltage source 1 is a voltage source for outputting DC voltage, and is, for example, a power storage device such as a battery. However, the DC voltage source is not limited thereto.

The power conversion device 2 has one end connected to the DC voltage source 1, and another end connected to the motor 3 as a load. The power conversion device 2 converts DC power from the DC voltage source 1 to AC power, and outputs the AC power to the motor 3, to operate the motor. Here, a case where the load is the motor 3 is shown, but the load may be any type.

The power conversion device 2 is a three-phase inverter circuit including a smoothing capacitor 11, an inverter circuit 12, a current detection circuit 15, and a control circuit 17. In the present embodiment, the three-phase inverter device is shown, but the power conversion device 2 may not necessarily be a three-phase inverter device, and may be an inverter circuit for a single phase or four or more phases.

The smoothing capacitor 11 has one end connected to a positive-side DC bus, and another end connected to a negative-side DC bus, and is connected in parallel to the DC voltage source 1 and legs of the inverter circuit 12 described later.

The inverter circuit 12 is a power conversion circuit that converts DC voltage outputted from the DC voltage source 1 to AC voltage and outputs the AC power, and has three legs connected in parallel to each other. Each leg is configured such that an upper arm and a lower arm each having a switching element, and a resistor, are connected in series. Both ends of each leg are connected to both ends of the smoothing capacitor 11 and both ends of the DC voltage source 1. In the example shown in FIG. 1, a switching element 13a, a switching element 13b, and a resistor 14a are connected in series to each other, a switching element 13c, a switching element 13d, and a resistor 14b are connected in series to each other, and a switching element 13e, a switching element 13f, and a resistor 14c are connected in series to each other. The connection point between the switching element 13a and the switching element 13b, the connection point between the switching element 13c and the switching element 13d, and the connection point between the switching element 13e and the switching element 13f, are connected to the motor 3, to supply AC current to the motor 3. A molded module of the inverter circuit 12 is referred to as an inverter module.

The current detection circuit 15 is a detection circuit that detects voltages across the resistors 14a to 14c provided in the legs of the inverter circuit 12 and thus detects currents flowing through the resistors, and includes differential amplifiers 15a to 15c. A current detection line 16aH connected between the switching element 13b and the resistor 14a, and a current detection line 16aL connected to another end of the resistor 14a, are connected to the differential amplifier 15a. The differential amplifier 15a amplifies the voltage generated across the resistor 14a while canceling out noises having the same phase and generated on the current detection line 16aH and the current detection line 16aL. Similarly, a current detection line 16bH connected between the switching element 13d and the resistor 14b, and a current detection line 16bL connected to another end of the resistor 14b, are connected to the differential amplifier 15b. The differential amplifier 15b amplifies the voltage generated across the resistor 14b while canceling out noises having the same phase and generated on the current detection line 16bH and the current detection line 16bL. In addition, a current detection line 16cH connected between the switching element 13f and the resistor 14c, and a current detection line 16cL connected to another end of the resistor 14c, are connected to the differential amplifier 15c. The differential amplifier 15c amplifies the voltage generated across the resistor 14c while canceling out noises having the same phase and generated on the current detection line 16cH and the current detection line 16cL. In the power conversion device shown in FIG. 1, the current detection circuits are provided for all the three legs. However, the current detection circuits may not necessarily be provided for all the legs.

The control circuit 17 is a control circuit for controlling switching operation of the inverter circuit 12, and controls the inverter circuit 12 on the basis of information about a current value detected by the current detection circuit 15, the magnetic pole position of the motor 3, and the rotational speed thereof. The control circuit 17 includes an error correction circuit 171 which corrects the current value detected by the current detection circuit 15 on the basis of the operation state of the inverter circuit 12, a comparison calculation unit 172 which performs comparison calculation between the current value corrected by the error correction circuit 171 and a current command value, to generate a duty command value, and a gate drive signal generation unit 173 which generates a gate drive timing for the inverter circuit 12 from the duty command value.

Figure 8:
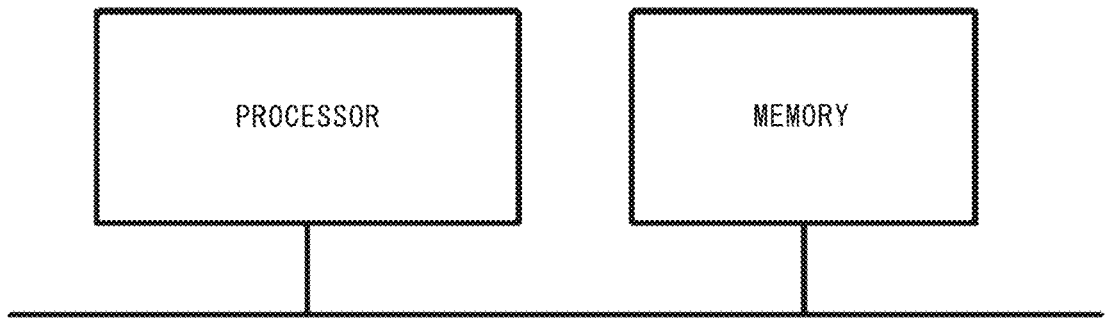
FIG. 8 shows a hardware configuration of a control circuit according to embodiment b 1.

The control circuit 17 generates a current command value for the inverter circuit 12 on the basis of voltage of the DC voltage source 1 which is input voltage to the inverter circuit 12, a motor rotational speed command value and a torque command value from a high-order control unit (not shown), and the magnetic pole position and the rotational speed of the motor 3. The error correction circuit 171 receives the operation state of the inverter circuit 12 (e.g., the current command value, and the duty command value from the comparison calculation unit 172), calculates a current detection error amount, generates a corrected current value obtained by correcting, with the current detection error amount, the current value detected by the current detection circuit 15, and outputs the corrected current value to the comparison calculation unit 172. The comparison calculation unit 172 performs comparison calculation between the current command value and the corrected current from the error correction circuit 171, to generate a duty command value. The gate drive signal generation unit 173 generates a gate drive signal for driving the inverter circuit 12, on the basis of the duty command value generated by the comparison calculation unit 172. The control circuit 17 may be configured by hardware or software. In a case of using hardware, a combination of a known controller and a known calculation circuit, etc., may be used. In a case of using software, for example, as shown in FIG. 8, a processor and a memory may be used in combination, and the processor executes a control program inputted from the memory.

The motor 3 is an example of a load that is connected to an output end of the power conversion device 2 and operates by being supplied with AC power from the power conversion device 2. The motor 3 is provided with a mechanism for measuring the magnetic pole position, i.e., the position (angle) of the rotor provided therein, and the rotational speed thereof, and outputs information of the measured magnetic pole position and rotational speed to the control circuit 17. The magnetic pole position and the rotational speed may not necessarily be measured values, and may be estimated values or values calculated from a command value.

Here, a method for calculating the current detection error amount will be described using an electromagnetic interference model of the inverter circuit 12. One of the legs composing the inverter circuit 12, i.e., the leg formed by the switching element 13a of the upper arm, the switching element 13b of the lower arm, and the resistor 14a, is used as an example, and an electromagnetic interference model with the current detection circuit is shown in FIG. 2. The same applies to models for the other legs, and therefore only the leg formed by the switching element 13*a* of the upper arm, the switching element 13*b* of the lower arm, and the resistor 14*a* will be described here. In the electromagnetic interference model shown in FIG. 2, when the switching element 13*a* of the upper arm is switched from ON to OFF, current of the motor 3 circulates to the lower arm, and the switching element 13*b* is switched to ON, current for each phase of the inverter circuit 12 is detected from voltage generated across the resistor 14*a*.

FIG. 2A shows a state in which the switching element 13*a* of the upper arm is ON, and the current route passes from the positive side of the smoothing capacitor 11 through the switching element 13*a* of the upper arm and then the motor 3, and returns to the negative side of the smoothing capacitor 11. FIG. 2B shows a state in which the switching element 13*a* of the upper arm is turned OFF from the state shown in FIG. 2A, and current from the motor 3 flows through a circulation route passing the switching element 13*b* of the lower arm and the resistor 14*a* and returning to the motor 3.

When the current route for the switching elements 13*a*, 13*b* is switched, induced voltage is generated on the current detection line 16*a*H due to electromagnetic induction because there is a mutual inductance MH between the current detection line 16*a*H and an inductance (hereinafter, referred to as one-loop inductance L1) of a one-loop circuit passing from the smoothing capacitor 11 through the switching elements 13*a*, 13*b* and the resistor 14*a* to another end of the smoothing capacitor. Similarly, induced voltage is generated on the current detection line 16*a*L due to electromagnetic induction because there is also a mutual inductance ML between the one-loop inductance L1 and the current detection line 16*a*L. Since the mutual inductance MH and the mutual inductance ML are not equal to each other, the absolute values of the induced voltages generated with the same phase are different from each other, so that the induced voltages are not ideally canceled out by the differential amplifier 15*a* and error voltage occurs. That is, the voltage generated on the circuit formed by the resistance and the inductance of the one-loop circuit formed by the smoothing capacitor 11, the switching elements 13*a*, 13*b*, and the resistor 14*a*, is subjected to electromagnetic induction by the mutual inductance M, so as to be inputted to the differential amplifier, and this can be represented as a model (FIG. 2*c*).

The inductance of the one-loop circuit formed by the smoothing capacitor 11, the switching elements 13*a*, 13*b*, and the resistor 14*a* is denoted by L1, voltage generated on the circuit is denoted by Vin, a mutual inductance between the current detection lines 16*a*H, 16*a*L and the one-loop circuit of the smoothing capacitor 11 and the switching elements 13*a*, 13*b* is denoted by M (=MH−ML), and output voltage generated due to electromagnetic induction on the differential amplifier 15*a* having a gain of 1, i.e., error voltage, is denoted by Vout. In this case, Vout is represented by the following Expression (1).

[Mathematical 1]

$$Vout = Vin \times \frac{M}{L1} \tag{1}$$

From Expression (1), it is found that, as the mutual inductance M becomes smaller or the one-loop inductance L1 becomes greater, the induced voltage generated on the differential amplifier becomes smaller. However, if the inverter module is downsized, the one-loop circuit formed by the smoothing capacitor 11, the switching elements 13*a*, 13*b*, and the resistor 14*a*, and the current detection lines 16*a*H, 16*a*L become close to each other, so that it becomes difficult to reduce the mutual inductance M. In addition, if the one-loop inductance L1 is increased, an influence of OFF surge of the switching elements 13*a*, 13*b* and the like arises, and this is not preferable.

However, the mutual inductance M between the current detection lines 16*a*H, 16*a*L and the inductance L1 of the one-loop circuit formed by the smoothing capacitor 11, the switching elements 13*a*, 13*b*, and the resistor 14*c*, is determined by the physical layout of arranged wiring of the inverter module. Therefore, if the influence on the current detection circuit 15 due to electromagnetic induction can be calculated in accordance with the operation state of the inverter, it is possible to perform current detection for which current detection error on the current detection circuit 15 has been corrected. Thus, the degree of freedom in designing of the inverter module is improved and size reduction is achieved, and also, since a more accurate current value is used, controllability for the motor 3 can be improved.

Figure 3B:
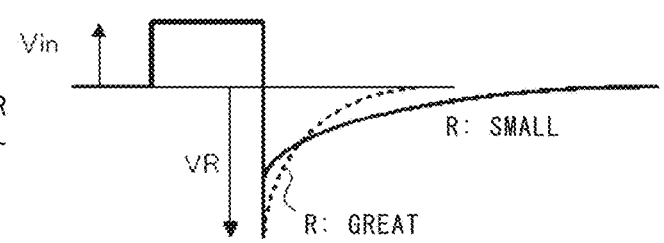

FIG. 3A and 3B illustrates a counter electromotive force generated on the inverter when the switching element 13*a* of the upper arm is switched from ON to OFF. As shown in FIG. 3A, when the switching element 13*a* of the upper arm is switched from ON to OFF, a counter electromotive force VR for causing current to continue flowing through the motor 3 is generated. Motor current which is current outputted from the inverter circuit 12 and flowing through the motor 3 is denoted by Imot, the resistance value of the resistor 14*a* is denoted by R, the inductance of the motor 3 is denoted by L, a period from when the switching element 13*a* is switched from ON to OFF until current is detected is denoted by t, and a resistance component of the switching element 13*b* of the lower arm is neglected. In this case, the counter electromotive force VR can be represented by Expression (2). Here, the motor current Imot may be an actual measured value of the output current from the inverter circuit 12 or current flowing through the motor 3, or may be a current command value calculated by the control circuit 17 (or a value obtained by multiplying the current command value by a certain coefficient).

[Mathematical 2]

$$VR = -Imot \times R \times e^{-\frac{R}{L}t} \tag{2}$$

As is found from Expression (2), the peak of the counter electromotive force is proportional to the motor current Imot and the resistance value of the resistor 14*a*, and regarding the time response, variation is suppressed more quickly if the resistance value of the resistor 14*a* is greater and the inductance of the motor 3 is smaller (FIG. 3B). In general, in order to obtain an electromagnetic force, the motor is configured to have a great inductance and the resistor is set to have a small resistance value in terms of suppression of heat generation. Therefore, when the counter electromotive force is generated on the motor, the time response of the voltage is slow and there is no influence due to a current detection timing as described in FIG. 4.

However, the counter electromotive force is voltage change on the motor, and at the same time, is voltage change on the one-loop circuit formed by the smoothing capacitor 11, the switching elements 13*a*, 13*b*, and the resistor 14*a*. In addition, the inductance of the one-loop circuit is a parasitic inductance of wiring formed by a lead frame of the inverter module and the like and therefore is extremely small. If a period until current is detected after the switching element 13a of the upper arm is switched from ON to OFF is short, since voltage response arising in the one-loop circuit has caused induced voltage due to electromagnetic induction on the current detection circuit 15, the current detection value is influenced by the induced voltage. Thus, the counter electromotive force VR can be represented as shown by Expression (3) using the one-loop inductance L1.

[Mathematical 3]

$$VR = -Imot \times R \times e^{-\frac{R}{L1}t} \quad (3)$$

Figure 4:
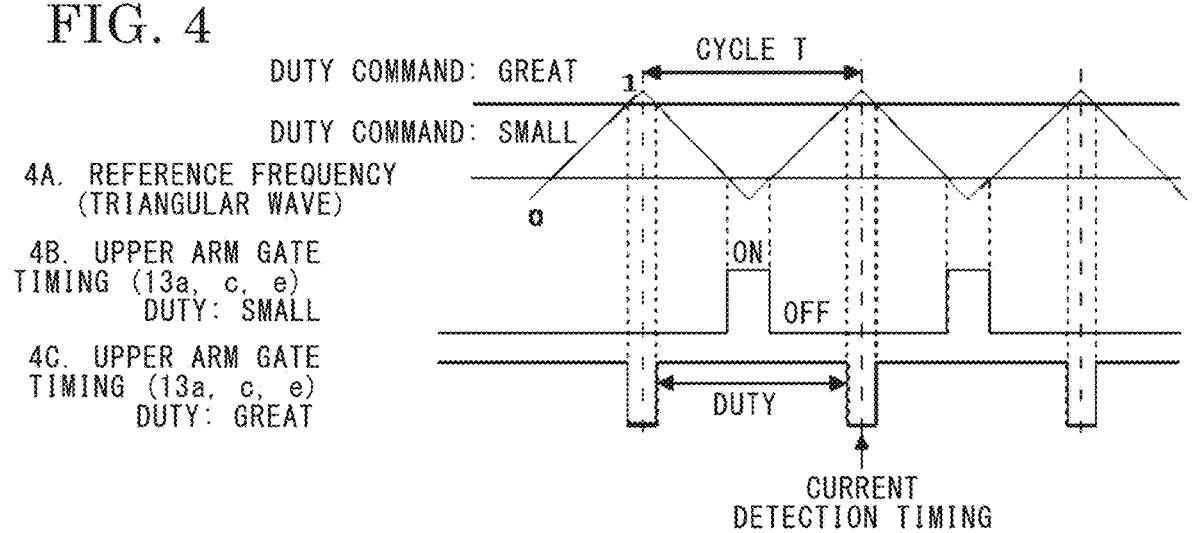
FIG. 4 illustrates gate driving and an inverter current detection timing according to embodiment 1.

FIG. 4 shows a timing relationship between a gate drive timing for the inverter circuit and current detection. In FIG. 4, "4A" shows a relationship of a triangular wave having a reference frequency and great and small duty commands. In addition, "4B" shows a gate drive timing for the switching element 13a of the upper arm of the inverter when the duty command is small, and "4C" shows a gate drive timing for the switching element 13a of the upper arm of the inverter when the duty command is great. In both cases, the triangular wave having the reference frequency is compared with the duty command, to generate the gate drive timing for the switching element 13a of the upper arm, and current detection is performed at a timing when the top of the triangular wave having the reference frequency comes next after the switching element 13a of the upper arm is turned OFF.

In a case where large current is supplied to the motor 3 as a load or the rotational speed is high, the duty is increased so that the average voltage applied to the motor 3 increases. Therefore, the ON period of the switching element of the upper arm becomes long, so that a period until the timing of detecting current after the switching element 13a is switched from ON to OFF becomes short. Thus, if transient response in switching remains, error is likely to occur in the detection current.

Figure 5:
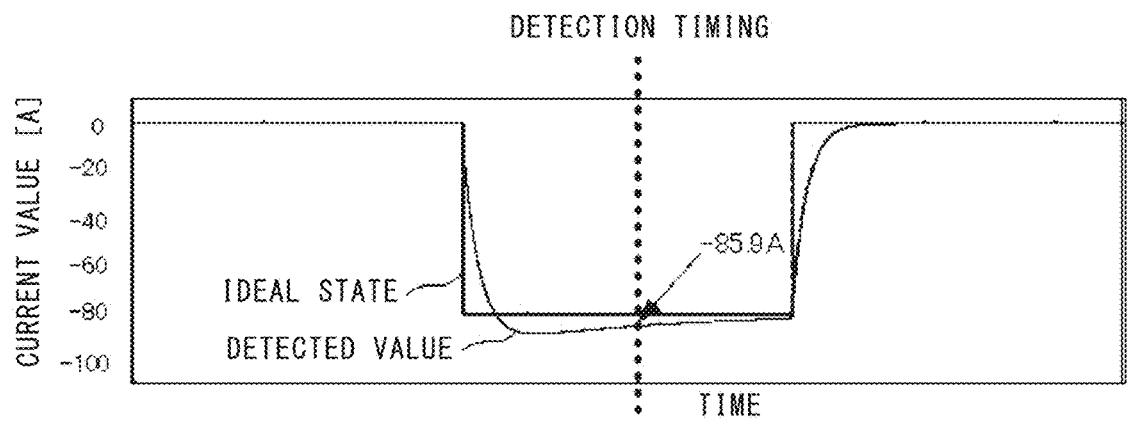
FIG. 5 illustrates the influence of induced voltage generated on the current detection circuit according to embodiment 1.

FIG. 5 shows current detection characteristics in conversion to current from voltage generated across the resistor 14a, in an ideal state and in a case where detection error voltage occurs due to electromagnetic induction on the current detection circuit 15. In FIG. 5, as an example, current of 80 A flows through the inverter, and current response has a rectangular waveform, in the ideal state. However, in the example shown in FIG. 5, a counter electromotive force is generated on the one-loop circuit of the smoothing capacitor 11, the switching elements 13a, 13b, and the resistor 14a, and voltage response causes electromagnetic induction on the current detection circuit 15, so that the current value becomes 85.9 A at the current detection timing. Thus, it is found that current error of about 6 A occurs as compared to 80 A which is the current value in the ideal state.

Here, error voltage Vout due to electromagnetic induction occurring at the input to the differential amplifier 15a is represented by Expression (4) using Expression (1) and Expression (3).

[Mathematical 4]

$$Vout = -Imot \times R \times e^{-\frac{R}{L1}t} \times \frac{M}{L1} \quad (4)$$

As is found from a time response waveform of current in FIG. 5 and Expression (4), detection error becomes great in a case where a period t until the current detection timing after the switching element 13a is switched from ON to OFF is short, i.e., the duty of the switching element 13a of the upper arm is great. The error correction circuit 171 corrects the current value detected by the current detection circuit 15, on the basis of the error voltage Vout obtained by Expression (4). Here, the resistance value R of the resistor 14a, the one-loop inductance L1, and the mutual inductance M are values determined by a circuit constant and a physical layout, and therefore can be made to be predetermined coefficients. Accordingly, the error correction circuit 171 corrects the current value detected by the current detection circuit 15, on the basis of the operation state of the inverter circuit 12, here, the motor current Imot and the period t until the current detection timing. The comparison calculation unit 172 generates a duty command on the basis of the corrected current value, and the gate drive signal generation unit 173 generates a gate drive signal on the basis of the generated duty command, to control the inverter circuit 12.

Since the motor current Imot and the period t as the operation state can be respectively calculated from the current command value and the duty command value, the error correction circuit 171 can correct the current value detected by the current detection circuit 15, on the basis of the current command value and the duty command value. That is, in the present embodiment in which the load is the motor 3, with the control circuit 17, the current value detected by the current detection circuit 15 can be corrected on the basis of the current command value for the inverter circuit 12 calculated from the voltage of the DC voltage source 1 which is the input voltage of the inverter circuit 12, the motor rotational speed command value and the torque command value from the high-order control unit (not shown), and the magnetic pole position and the rotational speed of the motor 3, and ½ of a value obtained by subtracting the duty command value from a predetermined control cycle. Here, the case of performing current detection at the timing when the top of the triangular wave comes has been shown. However, even in a case of performing detection at another timing, the period t can be calculated from the duty command value.

Figure 6:
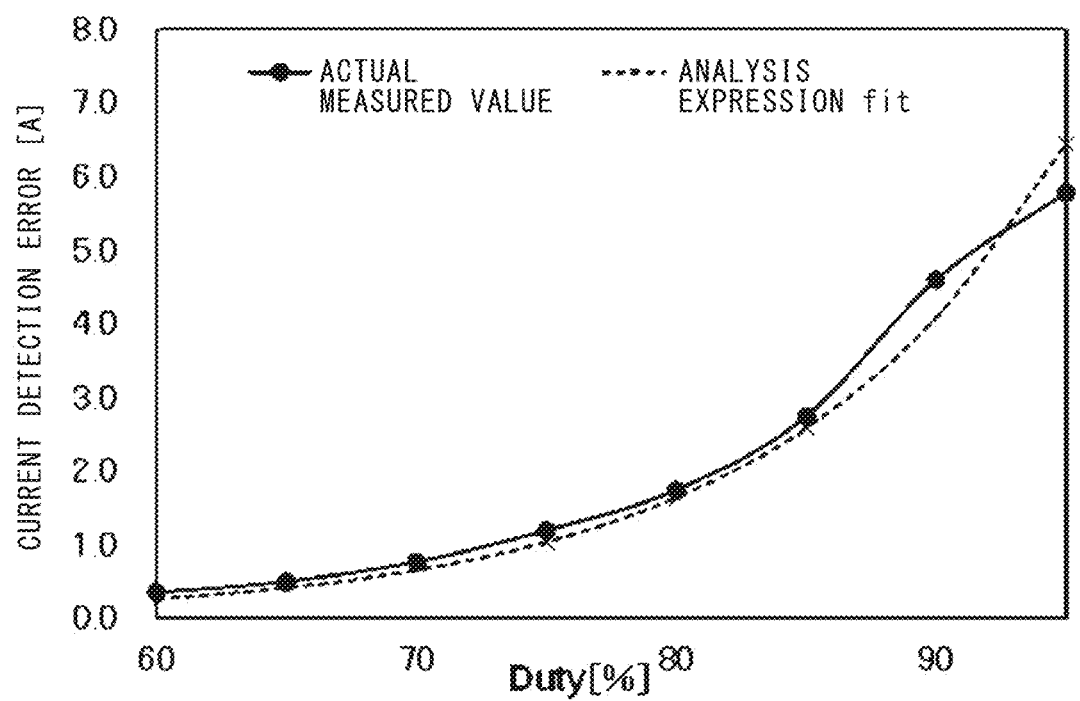
FIG. 6 is a characteristics graph showing the relationship between a duty and error voltage on the current detection circuit, obtained by a theoretical expression, according to embodiment 1.

FIG. 6 shows an experimental value obtained by the current detection circuit 15 and an amount (current error) by which a current value calculated using the theoretical expression shifts from an ideal state. The actual measured value and the current error calculated by the theoretical expression almost coincide with each other, and thus validity of the theoretical expression can be confirmed. In the error correction circuit 171, the current value obtained by the current detection circuit 15 is corrected using the above current detection error, whereby an accurate value of current flowing through the motor 3 can be obtained, and thus it becomes possible to improve accuracy of motor control.

Here, as is found from Expression (4), in a case where motor current is small or the duty is small and a sufficient period can be ensured for the current detection timing, and response due to electromagnetic induction is a certain value or smaller, so that detection error is small enough to be neglected, it is not necessary to perform correction. Since a correction calculation amount is obtained in advance through calculation from the current command value and the duty command value, if these command values are certain values or smaller so that response is to be suppressed by the current detection timing, it is not necessary to calculate detection error and correct the current from the current detection circuit 15, and thus the load on the control unit can be reduced.

Figure 7:
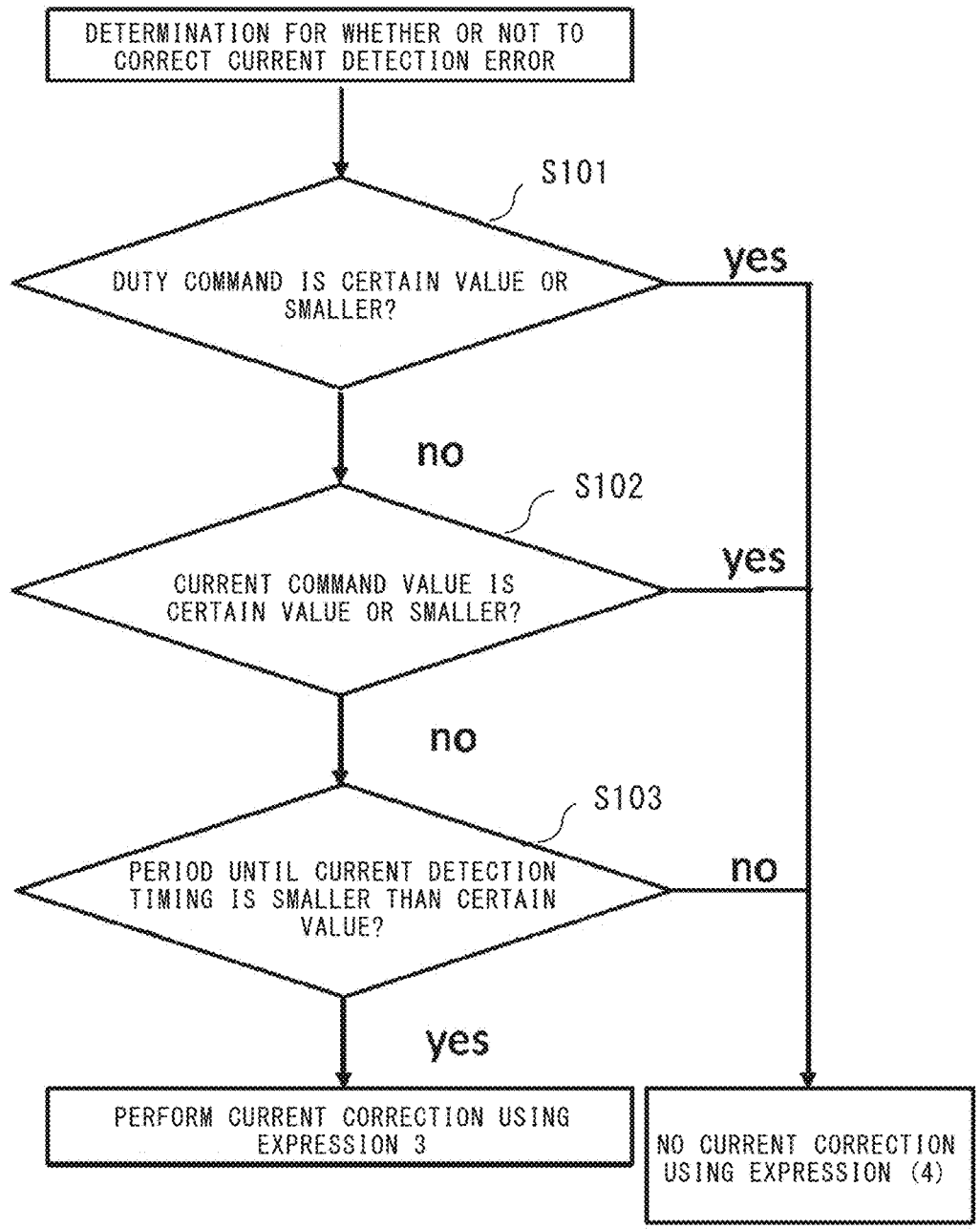
FIG. 7 is a flowchart for determining whether or not to perform correction, according to embodiment 1.

FIG. 7 shows a determination flowchart for determining whether or not to correct current detection error in the control circuit 17. In FIG. 7, the control circuit 17 generates a current command value for the inverter circuit 12 on the basis of the voltage of the DC voltage source 1 which is the input voltage of the inverter circuit 12, the motor rotational speed command value and the torque command value from the high-order control unit (not shown), and the magnetic pole position and the rotational speed of the motor 3, and calculates a duty command value from the current command value. In the control circuit 17, if the calculated duty command is not a predetermined certain value or smaller, the error correction circuit 171 does not perform current correction (step S101). Here, the predetermined certain value is set on the basis of an allowable error range for the motor control, for example. Next, if the current command value is a predetermined certain value or smaller, the error correction circuit 171 does not perform current correction (step S102). Here, as in step S101, the predetermined certain value is set on the basis of the allowable error range for the motor control, for example. Then, if the period t from when the switching element 13a of the upper arm is switched from ON to OFF until the timing when the current detection circuit 15 performs current detection, is smaller than a predetermined certain value, the error correction circuit 171 performs current correction (step S103). Here, as in step S101, the predetermined certain value is set on the basis of the allowable error range for the motor control, for example. As described above, in a case where detection error is small enough to be neglected, correction is not performed for the value detected by the current detection circuit 15, and thus the load on the control circuit can be reduced. In the flowchart shown in FIG. 7, three determinations in S101 to S103 are performed. However, without limitation thereto, one or more of the determinations in S101 to S103 may be performed.

The influence on the current detection characteristics due to electromagnetic induction has been described using the relationship between the leg formed by the switching elements 13a, 13b and the resistor 14a in the inverter circuit 12, and the current detection lines 16aH, 16aL and the differential amplifier 15a corresponding thereto in the current detection circuit 15. However, the same applies to the other legs (other phases) except that the current phase is different.

In the power conversion device described in the present embodiment, owing to the configuration and the operation as described above, even if error voltage has occurred on the current detection circuit due to electromagnetic induction, the error voltage is calculated from the operation state of the inverter and correction is performed, whereby current of the inverter can be accurately detected. Thus, it becomes possible to provide a power conversion device that can improve accuracy of motor control while suppressing size increase of the inverter. In addition, whether or not detection error is small enough to be neglected is determined on the basis of the operation state, and if detection error is small enough to be neglected, correction is not performed for the value detected by the current detection circuit, and thus the load on the control circuit can be reduced.

DESCRIPTION OF THE REFERENCE CHARACTERS

1 DC voltage source
2 power conversion device
3 motor
11 smoothing capacitor
12 inverter circuit
13a to 13f switching element
14a to 14c resistance
15 current detection circuit
15a to 15c differential amplifier
16aH, 16aL, 16bH, 16bL, 16cH, 16cL current detection line
17 control circuit
171 error correction circuit
172 comparison calculation unit
173 gate drive signal generation unit

The invention claimed is:

1. A power conversion device having one end connected to a DC voltage source and another end connected to a load, the power conversion device comprising:
   an inverter circuit which converts DC voltage from the DC voltage source to AC voltage and outputs the AC voltage to the load, the inverter circuit including a leg in which an upper arm and a lower arm each having a switching element, and a resistor, are connected in series, and a smoothing capacitor connected in parallel to the leg;
   a current detection circuit which detects voltage across the resistor, to detect current flowing through the resistor; and
   a control circuit which controls the inverter circuit, wherein
   the control circuit corrects the current value detected by the current detection circuit, using an error amount obtained on the basis of a current command value which is a command value for current to be outputted to the load and a duty command value which is a command value for a duty of the switching element, and controls the inverter circuit on the basis of the corrected current value.

2. The power conversion device according to claim 1, wherein
   the control circuit calculates the error amount on the basis of the current command value and the duty command value, and corrects the current value detected by the current detection circuit so that detection error of the current value becomes small on the basis of the error amount.

3. The power conversion device according to claim 1, wherein
   the control circuit corrects the current value detected by the current detection circuit, on the basis of error voltage which is the error amount obtained using
      a one-loop inductance which is an inductance of a one-loop circuit having the smoothing capacitor, the upper arm, the lower arm, and the resistor,
      a mutual inductance between the one-loop circuit and a current detection line of the current detection circuit,
      a resistance value of the resistor
      the current command value, and
      the duty command value, and
   the control circuit controls the inverter circuit on the basis of the corrected current value.

4. The power conversion device according to claim 1, wherein
   in the control circuit, error voltage Vout which is the error amount satisfies the following expression:

$$Vout = -Imot \times R \times e^{-\frac{R}{L1}t} \times \frac{M}{L1}$$

where
L1 is a one-loop inductance which is an inductance of a one-loop circuit having the smoothing capacitor, the upper arm, the lower arm, and the resistor,
M is a mutual inductance between the one-loop circuit and a current detection line of the current detection circuit,
R is a resistance value of the resistor,
t is a period from when the upper arm is switched from ON to OFF until the current is detected, the period t being calculated from the duty command value, and
Imot is a value of current to be outputted to the load, the value Imot being calculated from the current command value.

5. The power conversion device according to claim 1, wherein
the load is a motor,
the control circuit generates a current command value for the inverter circuit on the basis of the DC voltage from the DC voltage source, a magnetic pole position of the motor, a rotational speed of the motor, a rotational speed command value for the motor, and a torque command value for the motor, and
in a case where the generated current command value is a predetermined certain value or smaller, the control circuit does not correct the current value detected by the current detection circuit.

6. The power conversion device according to claim 1, wherein
the load is a motor,
the control circuit generates a current command value for the inverter circuit on the basis of the DC voltage from the DC voltage source, a magnetic pole position of the motor, a rotational speed of the motor, a rotational speed command value for the motor, and a torque command value for the motor,
the control circuit generates a duty command on the basis of the generated current command value and the current value detected by the current detection circuit, and
in a case where the generated duty command is a predetermined certain value or smaller, the control circuit does not correct the current value detected by the current detection circuit.

7. The power conversion device according to claim 1, wherein
in a case where a period from when the switching element of the upper arm is switched from ON to OFF until the current detection circuit detects the current is smaller than a predetermined certain value, the control circuit corrects the current value detected by the current detection circuit.

* * * * *